(12) United States Patent
Yonezawa

(10) Patent No.: US 9,880,372 B2
(45) Date of Patent: Jan. 30, 2018

(54) IMAGING LENS

(71) Applicant: KANTATSU CO., LTD., Yaita-shi, Tochigi (JP)

(72) Inventor: Tomohiro Yonezawa, Sukagawa (JP)

(73) Assignee: KANTATSU CO., LTD., Yaita (JP)

( * ) Notice: Subject to any disclaimer, the term of this patent is extended or adjusted under 35 U.S.C. 154(b) by 221 days.

(21) Appl. No.: 14/680,654

(22) Filed: Apr. 7, 2015

(65) Prior Publication Data

US 2015/0293331 A1    Oct. 15, 2015

(30) Foreign Application Priority Data

Apr. 10, 2014 (JP) .................................. 2014-081159

(51) Int. Cl.
*G02B 13/18* (2006.01)
*G02B 13/00* (2006.01)

(52) U.S. Cl.
CPC ................. *G02B 13/0045* (2013.01)

(58) Field of Classification Search
CPC ...... G02B 13/0045; G02B 9/60; G02B 13/18; G02B 9/62
See application file for complete search history.

(56) References Cited

U.S. PATENT DOCUMENTS

| | | | | |
|---|---|---|---|---|
| 4,274,711 A * | 6/1981 | Matsuo | .................... | G02B 9/62 359/758 |
| 8,072,695 B1 * | 12/2011 | Lee | .................... | G02B 13/0045 359/714 |
| 9,057,868 B1 | 6/2015 | Chung et al. | | |
| 9,316,812 B2 * | 4/2016 | Chiang | .............. | G02B 13/0045 |
| 2010/0254029 A1 * | 10/2010 | Shinohara | ................ | G02B 9/60 359/764 |
| 2010/0315723 A1 * | 12/2010 | Noda | ........................ | G02B 9/60 359/714 |
| 2012/0069455 A1 * | 3/2012 | Lin | ..................... | G02B 13/0045 359/714 |

(Continued)

FOREIGN PATENT DOCUMENTS

| CN | 201508432 U | 6/2010 |
|---|---|---|
| CN | 102313972 A | 1/2012 |

(Continued)

*Primary Examiner* — Bumsuk Won
*Assistant Examiner* — Balram Parbadia
(74) *Attorney, Agent, or Firm* — Oliff PLC

(57) ABSTRACT

A compact low-cost imaging lens with an F-value of 2.5 or less which achieves both low-profileness and a wide field of view and corrects various aberrations properly. It includes elements arranged from an object side to an image side as follows: a first lens with positive refractive power having a convex object-side surface; a second lens with negative refractive power having a concave object-side surface; a third lens with positive refractive power having convex object-side and image-side surfaces and having at least one aspheric surface; a fourth lens with positive refractive power as a double-sided aspheric lens having a convex image-side surface; and a fifth lens with negative refractive power as a double-sided aspheric lens having a concave image-side surface. The imaging lens satisfies a conditional expression $20<vd1-vd2<50$, where vd1 denotes Abbe number of the first lens at d-ray, and vd2 denotes Abbe number of the second lens at d-ray.

14 Claims, 10 Drawing Sheets

(56) References Cited

U.S. PATENT DOCUMENTS

| | | |
|---|---|---|
| 2012/0087019 A1 | 4/2012 | Tang et al. |
| 2012/0087020 A1* | 4/2012 | Tang ............... G02B 13/0045 359/714 |
| 2012/0262806 A1 | 10/2012 | Huang |
| 2013/0010374 A1 | 1/2013 | Hsieh et al. |
| 2013/0033764 A1 | 2/2013 | Tsai et al. |
| 2013/0033765 A1 | 2/2013 | Tsai et al. |
| 2013/0050847 A1 | 2/2013 | Hsu et al. |
| 2013/0100542 A1 | 4/2013 | Tsai et al. |
| 2013/0188263 A1 | 7/2013 | Tsai et al. |
| 2013/0201567 A1 | 8/2013 | Tsai et al. |
| 2013/0201568 A1 | 8/2013 | Tsai et al. |
| 2013/0279022 A1 | 10/2013 | Tang et al. |
| 2013/0286488 A1 | 10/2013 | Chae |
| 2014/0049837 A1 | 2/2014 | Liao et al. |
| 2014/0063619 A1 | 3/2014 | Lai |
| 2014/0092487 A1 | 4/2014 | Chen et al. |
| 2014/0098430 A1 | 4/2014 | Chou |
| 2014/0111874 A1* | 4/2014 | Chae ............... G02B 13/0045 359/714 |
| 2014/0177076 A1 | 6/2014 | Hsu et al. |
| 2015/0138421 A1 | 5/2015 | Chang et al. |
| 2015/0205072 A1 | 7/2015 | Liao |

FOREIGN PATENT DOCUMENTS

| | | |
|---|---|---|
| CN | 202102168 U | 1/2012 |
| CN | 102466854 A | 5/2012 |
| CN | 202305970 U | 7/2012 |
| CN | 202393963 U | 8/2012 |
| CN | 202486400 U | 10/2012 |
| CN | 202486401 U | 10/2012 |
| CN | 202502288 U | 10/2012 |
| CN | 202631836 U | 12/2012 |
| CN | 202693892 U | 1/2013 |
| CN | 103676095 A | 3/2014 |
| JP | 2010-48996 A | 3/2010 |
| JP | 2011-85733 A | 4/2011 |
| JP | 2013-174741 A | 9/2013 |
| TW | 201234068 A | 8/2012 |
| TW | 201250284 A | 12/2012 |
| TW | 201303411 A | 1/2013 |
| TW | 201305652 A | 2/2013 |
| TW | 201316029 A | 4/2013 |

\* cited by examiner

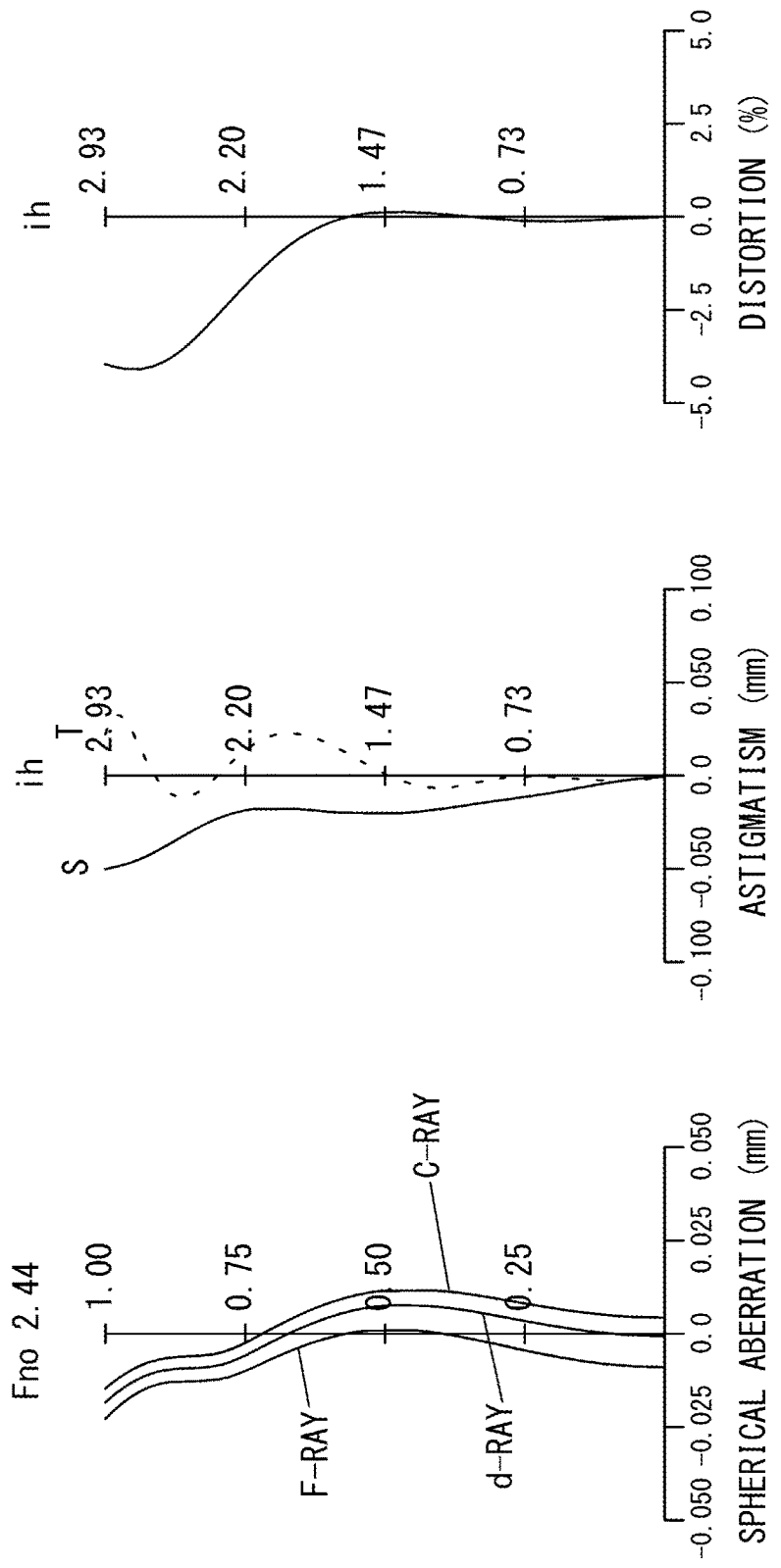

IMAGING LENS

The present application is based on and claims priority of Japanese patent application No. 2014-081159 filed on Apr. 10, 2014, the entire contents of which are hereby incorporated by reference.

BACKGROUND OF THE INVENTION

Field of the Invention

The present invention relates to an imaging lens which forms an image of an object on a solid-state image sensor such as a CCD sensor or a C-MOS sensor used in a compact image pickup device, and more particularly to an imaging lens built in an image pickup device mounted in an increasingly compact and low-profile smartphone, mobile phone, tablet PC, PDA (Personal Digital Assistant), game console, information terminal such as a PC, or home appliance with a camera function.

Description of the Related Art

In recent years, mobile terminals with a camera function have been spreading rapidly and the use of such built-in cameras for a variety of purposes, such as photo shooting, video shooting, and barcode reading, has been expanding and becoming popular in daily life and business. Also, home appliances with a camera function have been introduced into the market. For example, by telecommunication between a home appliance and a mobile host electronic device such as a smartphone, a user who is away from home can control the home appliance, set a timer, set the home appliance to the auto control mode, or can see in real time what is going on at home, through the camera mounted in the home appliance. Furthermore, wearable watch or glass type information terminals with a camera have also appeared in the market, and it seems that products which enhance consumer convenience like these products will be increasingly developed in the future. In addition, the camera mounted in such a product is strongly expected not only to provide high resolution to cope with an increase in the number of pixels but also to be compact and low-profile enough to be applicable to a low-profile product and to be able to capture an image of an object over a wide field of view and to offer high brightness (that is, a small F-value).

However, in order to provide a low-profile imaging lens with a wide field of view and high brightness as described above, the following problem has to be addressed: it is difficult to correct aberrations in the peripheral area of the image and ensure high imaging performance throughout the image.

Conventionally, for example, the imaging lenses described in JP-A-2010-048996 (Patent Document 1) and JP-A-2011-085733 (Patent Document 2) are known as compact high-resolution imaging lenses.

Patent Document 1 discloses an imaging lens composed of five constituent lenses, which includes, in order from an object side, a positive first lens, a negative second lens, a positive third lens, a negative fourth lens, and a negative fifth lens and features compactness and high brightness with an F-value of about 2.2 and corrects various aberrations properly.

Patent Document 2 discloses an imaging lens which includes, in order from an object side, a first lens group including a first lens having a convex surface on the object side, a second lens group including a second lens having a concave surface on an image side, a third lens group including a meniscus third lens having a concave surface on the object side, a fourth lens group including a meniscus fourth lens having a concave surface on the object side, and a fifth lens group including a meniscus fifth lens having an aspheric surface with an inflection point on the object side. This imaging lens is intended to provide a compact lens system with high resolution.

The imaging lens described in Patent Document 1, composed of five constituent lenses, corrects various aberrations properly and offers high brightness with an F-value of about 2.2; however, its total track length is from about 7.4 mm to about 7.9 mm and longer than the diagonal length of the effective imaging plane of the image sensor, which is disadvantageous in making the imaging lens low-profile. Furthermore, if this lens configuration is to provide a wide field of view, the problem with difficulty in correction of aberrations in the peripheral area of the image has to be addressed.

The imaging lens described in Patent Document 2 has a total track length of about 6.0 mm and the ratio of the total track length to the diagonal length of the effective imaging plane of the image sensor is about 0.9. Thus, it provides a relatively low-profile lens system which corrects aberrations properly. However, its F-value is about 2.8, so that its brightness is not sufficient to cope with a compact high-pixel image sensor. Furthermore, its field of view is about 65 degrees, which is not enough to meet the demand for imaging over a wide field of view. In order for this lens configuration to offer brightness with an F-value of 2.8 or less and a field of view of 65 degrees or more, the problem with difficulty in correction of aberrations in the peripheral area of the image has to be addressed.

As mentioned above, in the conventional art, it is difficult to provide a low-profile high-resolution imaging lens which offers a wide field of view and high brightness.

SUMMARY OF THE INVENTION

The present invention has been made in view of the above problem, and an object thereof is to provide a compact low-cost imaging lens which achieves both low-profileness and a wide field of view, offers brightness with an F-value of 2.5 or less, and corrects various aberrations properly.

Here, "low-profile" implies that total track length is shorter than the diagonal length of the effective imaging plane of the image sensor, and "wide field of view" implies that the field of view is 80 degrees or more. The diagonal length of the effective imaging plane of the image sensor is equal to the diameter of an effective image circle whose radius is the vertical height from an optical axis to the point where a light ray incident on the imaging lens at a maximum field of view enters the image plane, that is, the maximum image height.

According to an aspect of the present invention, there is provided an imaging lens which forms an image of an object on a solid-state image sensor, in which elements are arranged in order from an object side to an image side as follows: a first lens with positive refractive power having a convex surface on the object side; a second lens with negative refractive power having a concave surface on the object side; a third lens with positive refractive power having a convex surface on each of the object and image sides and having at least one aspheric surface; a fourth lens with positive refractive power as a double-sided aspheric lens having a convex surface on the image side; and a fifth lens with negative refractive power as a double-sided aspheric lens having a concave surface on the image side. The imaging lens satisfies a conditional expression (1) below:

$$20 < vd1 - vd2 < 50 \quad (1)$$

where vd1: Abbe number of the first lens at d-ray vd2: Abbe number of the second lens at d-ray.

In the imaging lens with the above configuration, positive, negative, positive, positive, and negative refractive power constituent lenses are arranged in order from the object side, making up virtually a telephoto optical system, in which refractive power is appropriately distributed to each constituent lens to make the imaging lens low-profile. The positive refractive power required for an overall optical system of the imaging lens is distributed to the first lens and the fourth lens in a balanced manner, thereby making it easy to achieve low-profileness. The second lens, having a concave surface on the object side, facilitates entry of light rays over a wide field of view and effectively corrects chromatic aberrations and spherical aberrations which occur on the first lens. The third lens has relatively weak positive refractive power among the constituent lenses and gives additional positive refractive power to the overall optical system of the imaging lens to keep the focal length of the overall optical system short and contribute to achieving low-profileness and a wide field of view. In addition, its aspheric surface makes it easy to correct mainly spherical aberrations and astigmatic difference. The aspheric surfaces on the both sides of the fourth lens have a function to correct off-axial aberrations, particularly astigmatism, field curvature, and distortion. The aspheric image-side surface of the fifth lens makes final correction of off-axial field curvature, astigmatism, and distortion properly and facilitates control of the angle of a chief ray incident on the image plane. Thus configured, the imaging lens can be low-profile and offer a wide field of view and high brightness and deliver high imaging performance.

In the present invention, "refractive power" means paraxial refractive power (refractive power near the optical axis) of a lens, and a convex or concave surface means that the surface of the paraxial portion of a lens is convex or concave.

In the imaging lens with the above configuration, the aspheric image-side surface of the fifth lens preferably has a pole-change point off the optical axis. When the fifth lens has an aspheric image-side surface with a pole-change point off the optical axis, it can correct off-axial field curvature, astigmatism, and distortion and control the angle of a chief ray incident on the image plane more properly. Here, a "pole-change point" means a point on an aspheric surface at which a tangential plane intersects the optical axis perpendicularly, in a lens sectional shape within an effective radius.

The conditional expression (1) defines an appropriate range for the difference between the Abbe numbers of the first lens and the second lens, and indicates a condition to correct chromatic aberrations properly. If the value is below the lower limit of the conditional expression (1), the difference between the Abbe numbers of the first lens and the second lens would be too small and the so-called achromatic effect would be reduced, making it difficult to correct chromatic aberrations. On the other hand, if the value is above the upper limit of the conditional expression (1), the options for inexpensive lens materials would be fewer, making it difficult to reduce the cost of the imaging lens.

Preferably, the imaging lens according to the present invention satisfies conditional expressions (2) and (3) below:

$$0.5 < f1/|f2| < 1.2 \qquad (2)$$

$$0.04 < T12/f < 0.14 \qquad (3)$$

where f: focal length of the overall optical system of the imaging lens, f1: focal length of the first lens, f2: focal length of the second lens, and T12: air gap on the optical axis between the first lens and the second lens.

The conditional expression (2) defines an appropriate range for the ratio of the focal length of the first lens to the focal length of the second lens, which represents the relation in refractive power between the first and second lenses, and indicates a condition to make the imaging lens low-profile and offer a wide field of view and suppress chromatic aberrations and spherical aberrations within appropriate ranges. If the value is below the lower limit of the conditional expression (2), the refractive power of the first lens would be too strong relative to the refractive power of the second lens to correct chromatic aberrations and spherical aberrations. On the other hand, if the value is above the upper limit of the conditional expression (2), the refractive power of the first lens would be too weak relative to the refractive power of the second lens and it would be difficult to keep the focal length of the overall optical system short and achieve both low-profileness and a wide field of view.

The conditional expression (3) defines an appropriate range for the ratio of the air gap on the optical axis between the first lens and the second lens to the focal length of the overall optical system of the imaging lens, and indicates a condition to minimize the eccentricity between the first lens and the second lens and suppress distortion, field curvature, and astigmatic difference within appropriate ranges. If the value is below the lower limit of the conditional expression (3), distortion would increase toward the minus side and also field curvature would increase toward the minus side, making it difficult to deliver high imaging performance. On the other hand, if the value is above the upper limit of the conditional expression (3), distortion would increase toward the plus side and astigmatic difference in the peripheral area of the image would increase, again making it difficult to deliver high imaging performance. Furthermore, if the value is above the upper limit of the conditional expression (3), the distance between the first lens and the second lens would increase, which would cause increase in error sensitivity due to the eccentricity between the first lens and the second lens and might result in deteriorated imaging performance.

Preferably, the imaging lens according to the present invention satisfies a conditional expression (4) below:

$$2.0 < f3/f < 8.0 \qquad (4)$$

where f: focal length of the overall optical system of the imaging lens, and f3: focal length of the third lens.

The conditional expression (4) defines an appropriate range for the ratio of the focal length of the third lens to the focal length of the overall optical system of the imaging lens, which represents the refractive power of the third lens relative to the refractive power of the overall optical system of the imaging lens, and indicates a condition to ensure an appropriate back focus, low-profileness and a wide field of view and suppress spherical aberrations which occur on the third lens. If the value is below the lower limit of the conditional expression (4), the positive refractive power of the third lens would be too strong to ensure an appropriate back focus and suppress spherical aberrations which occur on the third lens, though it would be advantageous in achieving low-profileness and a wide field of view. On the other hand, if the value is above the upper limit of the conditional expression (4), the positive refractive power of the third lens would be too weak to achieve low-profileness and a wide field of view, though it would be advantageous in ensuring an appropriate back focus and suppressing spherical aberrations which occur on the third lens.

Preferably, the imaging lens according to the present invention satisfies a conditional expression (5) below:

$$0.8 < f1/f4 < 1.4 \tag{5}$$

where
f1: focal length of the first lens, and
f4: focal length of the fourth lens.

The conditional expression (5) defines an appropriate range for the ratio of the focal length of the first lens to the focal length of the fourth lens, which represents the relation in refractive power between the first lens and the fourth lens which provide the positive refractive power required for the overall optical system of the imaging lens. When the conditional expression (5) is satisfied, the refractive power of the first lens and that of the fourth lens are well balanced so that it is easy to correct spherical aberrations, coma aberrations, and astigmatism and the total track length is kept short to achieve low-profileness. If the value is below the lower limit of the conditional expression (5), the refractive power of the first lens would be too strong relative to the refractive power of the fourth lens. As a consequence, the principal point position of the overall optical system of the imaging lens would shift more toward the object side and thus make it easy to shorten the total track length, but spherical aberrations which occur on the first lens would tend to increase. On the other hand, if the value is above the upper limit of the conditional expression (5), the refractive power of the first lens relative to the refractive power of the fourth lens would be too weak to shift the principal point position of the overall optical system of the imaging lens toward the object side, though it would be advantageous in suppressing spherical aberrations which occur on the first lens. This would result in a longer back focus and make it difficult to ensure a short total track length or low-profileness. Furthermore, it would be difficult to suppress coma aberrations and astigmatism which occur on the fourth lens.

Preferably, the imaging lens according to the present invention satisfies a conditional expression (6) below:

$$-1.2 < f5/f < -0.5 \tag{6}$$

where
f: focal length of the overall optical system of the imaging lens, and
f5: focal length of the fifth lens.

The conditional expression (6) defines an appropriate range for the ratio of the focal length of the fifth lens to the focal length of the overall optical system of the imaging lens, which represents the refractive power of the fifth lens relative to the refractive power of the overall optical system of the imaging lens, and indicates a condition to ensure an appropriate back focus and suppress increase in the eccentricity error sensitivity of the fifth lens. If the value is below the lower limit of the conditional expression (6), the refractive power of the fifth lens would be too weak to ensure an appropriate back focus to provide space required for insertion of an infrared cut filter or the like, though it would be advantageous in shortening the total track length. On the other hand, if the value is above the upper limit of the conditional expression (6), the eccentricity error sensitivity between the object-side surface and the image-side surface of the fifth lens and the eccentricity error sensitivity of the fifth lens in the optical system would be likely to increase. This would decrease the manufacturing yield in precision lens molding and assembly.

Preferably, the imaging lens according to the present invention satisfies a conditional expression (7) below:

$$-0.4 < (r1+r2)/(r1-r2) < 0.15 \tag{7}$$

where
r1: curvature radius of the object-side surface of the first lens, and
r2: curvature radius of the image-side surface of the first lens.

The conditional expression (7) defines the paraxial shape of the first lens, and indicates a condition to suppress distortion, astigmatism, and spherical aberrations within appropriate ranges. If the value is below the lower limit of the conditional expression (7), the refractive power of the object-side surface of the first lens for off-axial rays would be weak, leading to increase in off-axial distortion and astigmatism on the image-side surface of the first lens and making it difficult to deliver high imaging performance, though it would be advantageous in suppressing spherical aberrations. On the other hand, if the value is above the upper limit of the conditional expression (7), it would be advantageous in suppressing off-axial distortion and astigmatism on the image-side surface of the first lens, but the refractive power of the object-side surface of the first lens for paraxial rays would be weak, leading to increase in spherical aberrations on the image-side surface of the first lens and again making it difficult to deliver high imaging performance.

Preferably, the imaging lens according to the present invention satisfies a conditional expression (8) below:

$$-1.9 < (r3+r4)/(r3-r4) < -0.9 \tag{8}$$

where
r3: curvature radius of the object-side surface of the second lens, and
r4: curvature radius of the image-side surface of the second lens.

The conditional expression (8) defines the paraxial shape of the second lens, and indicates a condition to suppress chromatic aberrations and spherical aberrations within appropriate ranges. If the value is below the lower limit or above the upper limit of the conditional expression (8), chromatic aberrations and spherical aberrations which occur on the first lens could not be corrected properly and it would be difficult to deliver high imaging performance.

Preferably, the imaging lens according to the present invention satisfies a conditional expression (9) below:

$$-1.0 < (r5+r6)/(r5-r6) < 1.0 \tag{9}$$

where
r5: curvature radius of the object-side surface of the third lens, and
r6: curvature radius of the image-side surface of the third lens.

The conditional expression (9) defines the paraxial shape of the third lens, and indicates a condition to suppress spherical aberrations and astigmatic difference within appropriate ranges. If the value is below the lower limit or above the upper limit of the conditional expression (9), spherical aberrations and astigmatic difference could not be corrected properly and it would be difficult to deliver high imaging performance.

In addition, in the imaging lens according to the present invention, all the constituent lenses can be made of plastic material suitable for mass production, so that the imaging lens can be supplied at low cost.

BRIEF DESCRIPTION OF THE DRAWINGS

FIG. 10 shows spherical aberration, astigmatism, and distortion of the imaging lens in Example 5 of the present invention.

DETAILED DESCRIPTION OF THE PREFERRED EMBODIMENT

Hereinafter, the preferred embodiment of the present invention will be described in detail referring to the accompanying drawings. FIGS. 1, 3, 5, 7, and 9 are schematic views showing the general configurations of the imaging lenses in Examples 1 to 5 according to this embodiment, respectively. Since all these examples have the same basic lens configuration, the general configuration of an imaging lens according to this embodiment is explained below referring to the schematic view of Example 1.

Figure 1:
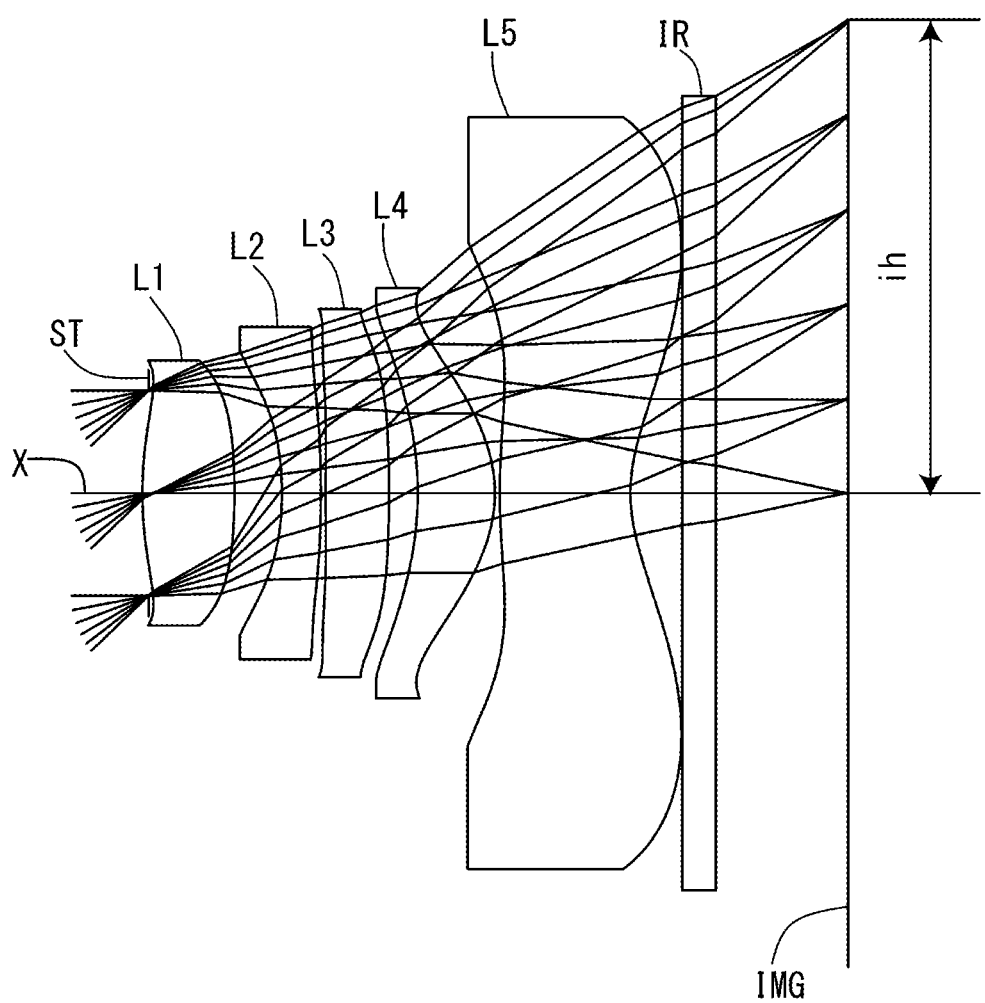
FIG. 1 is a schematic view showing the general configuration of an imaging lens in Example 1 of the present invention.

As shown in FIG. 1, the imaging lens according to the preferred embodiment of the present invention forms an image of an object on a solid-state image sensor and includes, in order from an object side to an image side, a first lens L1 with positive refractive power having a convex surface on the object side, a second lens L2 with negative refractive power having a concave surface on the object side, a third lens L3 with positive refractive power having a convex surface on each of the object and image sides and having at least one aspheric surface, a fourth lens L4 with positive refractive power as a double-sided aspheric lens having a convex surface on the image side, and a fifth lens L5 with negative refractive power as a double-sided aspheric lens having a concave surface on the image side. A filter IR such as an infrared cut filter is located between the fifth lens L5 and an image plane IMG. The filter IR is omissible. In this embodiment, the values of total track length and back focus are equivalent air distances.

In the imaging lens with the above configuration, positive, negative, positive, positive, and negative refractive power constituent lenses are arranged in order from the object side, making up virtually a telephoto optical system, and the distribution of refractive power to each constituent lens is optimized to make the imaging lens low-profile. The positive refractive power required for the overall optical system of the imaging lens is distributed to the first lens L1 and the fourth lens L4 in a balanced manner, making it easy to achieve low-profileness. The second lens L2, having a concave surface on the object side, facilitates entry of rays over a wide field of view and effectively corrects chromatic aberrations and spherical aberrations which occur on the first lens L1. The third lens L3, having relatively weak positive refractive power among the constituent lenses, gives additional positive refractive power to the overall optical system of the imaging lens to keep the focal length of the overall optical system short and contribute to achieving low-profileness and a wide field of view, and its aspheric surface makes it easy to correct mainly spherical aberrations and astigmatic difference. The aspheric surfaces on the both sides of the fourth lens L4 correct off-axial aberrations, particularly astigmatism, field curvature, and distortion. The image-side surface of the fifth lens L5, having an aspheric surface with pole-change points off an optical axis X, makes final correction of off-axial field curvature, astigmatism and distortion properly and facilitates control of the angle of a chief ray incident on the image plane IMG. Since an aperture stop ST is located on the object side of the first lens L1, the exit pupil position is remote from the image plane IMG and it is easy to ensure telecentricity. Thus configured, the imaging lens according to this embodiment is low-profile and offers a wide field of view and high brightness and delivers high imaging performance.

When the imaging lens according to this embodiment satisfies conditional expressions (1) to (9) below, it brings about advantageous effects:

$$20 < vd1 - vd2 < 50 \quad (1)$$

$$0.5 < f1/|f2| < 1.2 \quad (2)$$

$$0.04 < T12/f < 0.14 \quad (3)$$

$$2.0 < f3/f < 8.0 \quad (4)$$

$$0.8 < f1/f4 < 1.4 \quad (5)$$

$$-1.2 < f5/f < -0.5 \quad (6)$$

$$-0.4 < (r1+r2)/(r1-r2) < 0.15 \quad (7)$$

$$-1.9 < (r3+r4)/(r3-r4) < -0.9 \quad (8)$$

$$-1.0 < (r5+r6)/(r5-r6) < 1.0 \quad (9)$$

where
f: focal length of the overall optical system of the imaging lens,
f1: focal length of the first lens L1,
f2: focal length of the second lens L2,
f3: focal length of the third lens L3,
f4: focal length of the fourth lens L4,
f5: focal length of the fifth lens L5,
r1: curvature radius of the object-side surface of the first lens L1,
r2: curvature radius of the image-side surface of the first lens L1, r3: curvature radius of the object-side surface of the second lens L2,
r4: curvature radius of the image-side surface of the second lens L2,
r5: curvature radius of the object-side surface of the third lens L3,
r6: curvature radius of the image-side surface of the third lens L3,
T12: air gap on the optical axis X between the first lens L1 and the second lens L2,
vd1: Abbe number of the first lens L1 at d-ray, and
vd2: Abbe number of the second lens L2 at d-ray.

When the imaging lens according to this embodiment satisfies conditional expressions (1a) to (9a) below, it brings about more advantageous effects:

$$25 < vd1 - vd2 < 40 \quad (1a)$$

$$0.6 < f1/|f2| < 0.9 \quad (2a)$$

$$0.05 < T12/f < 0.12 \quad (3a)$$

$$2.5 < f3/f < 7.5 \quad (4a)$$

$$0.9 < f1/f4 < 1.3 \quad (5a)$$

$$-1.1 < f5/f < -0.6 \quad (6a)$$

$$-0.35 < (r1+r2)/(r1-r2) < 0.12 \quad (7a)$$

$$-1.7 < (r3+r4)/(r3-r4) < -1.1 \quad (8a)$$

$$-0.6 < (r5+r6)/(r5-r6) < 0.8. \quad (9a)$$

The signs in the above conditional expressions have the same meanings as in the preceding paragraph.

When the imaging lens according to this embodiment satisfies conditional expressions (1b) to (9b) below, it brings about particularly advantageous effects:

$$25 < vd1 - vd2 < 35 \quad (1b)$$

$$0.71 \leq f1/|f2| \leq 0.76 \quad (2b)$$

$$0.08 \leq T12/f \leq 0.10 \quad (3b)$$

$$3.57 \leq f3/f \leq 5.87 \quad (4b)$$

$$0.98 \leq f1/f4 \leq 1.16 \quad (5b)$$

$$-0.90 \leq f5/f \leq -0.83 \quad (6b)$$

$$-0.31 \leq (r1+r2)/(r1-r2) \leq 0.09 \quad (7b)$$

$$-1.58 \leq (r3+r4)/(r3-r4) \leq -1.28 \quad (8b)$$

$$-0.24 \leq (r5+r6)/(r5-r6) \leq 0.57. \quad (9b)$$

The signs in the above conditional expressions have the same meanings as in the paragraph before the preceding paragraph.

When the conditional expression (1), concerning the Abbe numbers of the first lens L1 and the second lens L2, is satisfied, the difference between the Abbe numbers of the first lens L1 and the second lens L2 is within an appropriate range to correct chromatic aberrations properly.

When the conditional expression (2), concerning the relation in refractive power between the first lens L1 and the second lens L2, is satisfied, the refractive power of the first lens L1 and that of the second lens L2 are appropriately balanced to correct chromatic aberrations and spherical aberrations properly and achieve both low-profileness and a wide field of view.

When the conditional expression (3), concerning the air gap on the optical axis X between the first lens L1 and the second lens L2, is satisfied, the ratio of the air gap on the optical axis X between the first lens L1 and the second lens L2 to the focal length of the overall optical system of the imaging lens is within an appropriate range to minimize the eccentricity between the first lens L1 and the second lens L2 and make it easy to correct distortion, field curvature, and astigmatic difference and deliver high imaging performance.

When the conditional expression (4), concerning the refractive power of the third lens L3, is satisfied, the positive refractive power of the third lens L3 is within an appropriate range to ensure an appropriate back focus, achieve low-profileness and a wide field of view, and suppress spherical aberrations which occur on the third lens L3.

When the conditional expression (5), concerning the relation in refractive power between the first lens L1 and the fourth lens L4, is satisfied, the refractive power of the first lens L1 and that of the fourth lens L4 are appropriately balanced to facilitate correction of spherical aberrations, coma aberrations, and astigmatism and ensure a short total track length and low-profileness.

When the conditional expression (6), concerning the refractive power of the fifth lens L5, is satisfied, the refractive power of the fifth lens L5 is within an appropriate range to ensure an appropriate back focus and suppress increase in the eccentricity error sensitivity of the fifth lens L5.

When the conditional expression (7), concerning the paraxial shape of the first lens L1, is satisfied, distortion, astigmatism, and spherical aberrations on the image-side surface of the first lens L1 are suppressed, and high imaging performance is delivered.

When the conditional expression (8), concerning the paraxial shape of the second lens L2, is satisfied, chromatic aberrations and spherical aberrations which occur on the first lens L1 are corrected properly, and high imaging performance is delivered.

When the conditional expression (9), concerning the paraxial shape of the third lens L3, is satisfied, spherical aberrations and astigmatic difference are corrected properly, and high imaging performance is delivered.

In this embodiment, all the lens surfaces are aspheric. The aspheric shapes of these lens surfaces are expressed by Equation 1, where Z denotes an axis in the optical axis direction, H denotes a height perpendicular to the optical axis, k denotes a conic constant, and A4, A6, A8, A10, A12, A14, and A16 denote aspheric surface coefficients.

$$Z = \frac{\frac{H^2}{R}}{1 + \sqrt{1 - (k+1)\frac{H^2}{R^2}}} + A_4 H^4 + A_6 H^6 + A_8 H^8 + A_{10} H^{10} + A_{12} H^{12} + A_{14} H^{14} + A_{16} H^{16} \quad \text{Equation 1}$$

Next, examples of the imaging lens according to this embodiment will be explained. In each example, f denotes the focal length of the overall optical system of the imaging lens, Fno denotes an F-number, ω denotes a half field of view, ih denotes a maximum image height, and TLA and bf denote total track length and back focus as equivalent air distances. i denotes a surface number counted from the object side, r denotes a curvature radius, d denotes the distance on the optical axis between lens surfaces (surface distance), Nd denotes a refractive index at d-ray (reference wavelength), and vd denotes an Abbe number at d-ray. As for aspheric surfaces, an asterisk (*) after surface number i indicates that the surface concerned is an aspheric surface.

EXAMPLE 1

The basic lens data of Example 1 is shown in Table 1 below.

TABLE 1

Example 1
in mm
f = 3.10
Fno = 2.44
ω(°) = 43.9
ih = 2.93
TLA = 4.30
bf = 1.28

Surface Data

| Surface No. i | Curvature Radius r | Surface Distance d | Refractive Index Nd | Abbe Number vd |
|---|---|---|---|---|
| (Object Surface) | Infinity | Infinity | | |
| 1 (Stop) | Infinity | −0.038 | | |
| 2* | 2.307 | 0.570 | 1.544 | 55.57 |
| 3* | −4.389 | 0.294 | | |
| 4* | −1.941 | 0.240 | 1.635 | 23.91 |
| 5* | −9.257 | 0.030 | | |
| 6* | 22.028 | 0.392 | 1.544 | 55.57 |
| 7* | −10.164 | 0.178 | | |
| 8* | −2.074 | 0.477 | 1.544 | 55.57 |
| 9* | −0.880 | 0.030 | | |
| 10* | 3.900 | 0.808 | 1.544 | 55.57 |
| 11* | 0.992 | 0.320 | | |
| 12 | Infinity | 0.210 | 1.517 | 64.20 |
| 13 | Infinity | 0.824 | | |
| Image Plane | Infinity | | | |

Constituent Lens Data

| Lens | Start Surface | Focal Length |
|---|---|---|
| 1 | 2 | 2.866 |
| 2 | 4 | −3.918 |
| 3 | 6 | 12.844 |
| 4 | 8 | 2.465 |
| 5 | 10 | −2.711 |

Aspheric Surface Data

| | 2nd Surface | 3rd Surface | 4th Surface | 5th Surface | 6th Surface |
|---|---|---|---|---|---|
| k | 0.000E+00 | 0.000E+00 | 0.000E+00 | 0.000E+00 | 0.000E+00 |
| A4 | −7.499E−02 | −2.260E−01 | −2.763E−01 | −1.582E−01 | −1.026E−01 |
| A6 | −1.121E−01 | −9.348E−02 | 1.893E−01 | 2.256E−01 | −3.257E−02 |
| A8 | −2.832E−03 | 1.820E−02 | 9.114E−02 | 3.350E−02 | 1.811E−01 |
| A10 | −2.021E−01 | −1.010E−01 | 6.334E−02 | −1.695E−01 | −9.791E−02 |
| A12 | −2.030E−01 | 2.676E−01 | −8.906E−02 | 1.070E−01 | 2.978E−02 |
| A14 | 0.000E+00 | −3.692E−01 | −1.363E−02 | −4.214E−02 | −1.990E−02 |
| A16 | 0.000E+00 | 0.000E+00 | 0.000E+00 | 0.000E+00 | 0.000E+00 |

| | 7th Surface | 8th Surface | 9th Surface | 10th Surface | 11th Surface |
|---|---|---|---|---|---|
| k | 0.000E+00 | 0.000E+00 | −8.362E−01 | 0.000E+00 | −5.275E+00 |
| A4 | −8.700E−02 | 4.407E−02 | 1.880E−01 | −1.546E−01 | −7.491E−02 |
| A6 | −1.003E−02 | 3.671E−03 | −1.021E−01 | 3.839E−02 | 2.715E−02 |
| A8 | −1.091E−02 | −9.978E−03 | 9.964E−02 | −1.634E−02 | −8.843E−03 |
| A10 | 3.125E−03 | −2.229E−03 | −2.872E−02 | 8.434E−03 | 2.001E−03 |
| A12 | 4.941E−03 | 2.221E−03 | 1.054E−02 | −1.888E−03 | −3.041E−04 |
| A14 | 8.576E−03 | 4.747E−03 | 2.131E−03 | 2.271E−04 | 2.822E−05 |
| A16 | 0.000E+00 | 0.000E+00 | −2.666E−03 | −2.389E−05 | −1.308E−06 |

As shown in Table 2 below, the imaging lens in Example 1 satisfies all the conditional expressions (1) to (9).

TABLE 2

| (1) vd1 − vd2 | 31.66 |
|---|---|
| (2) f1/|f2| | 0.73 |
| (3) T12/f | 0.09 |
| (4) f3/f | 4.15 |
| (5) f1/f4 | 1.16 |
| (6) f5/f | −0.87 |
| (7) (r1 + r2)/(r1 − r2) | −0.31 |

TABLE 2-continued

| | |
|---|---|
| (8)(r3 + r4)/(r3 − r4) | −1.53 |
| (9)(r5 + r6)/(r5 − r6) | 0.37 |

Figure 2:
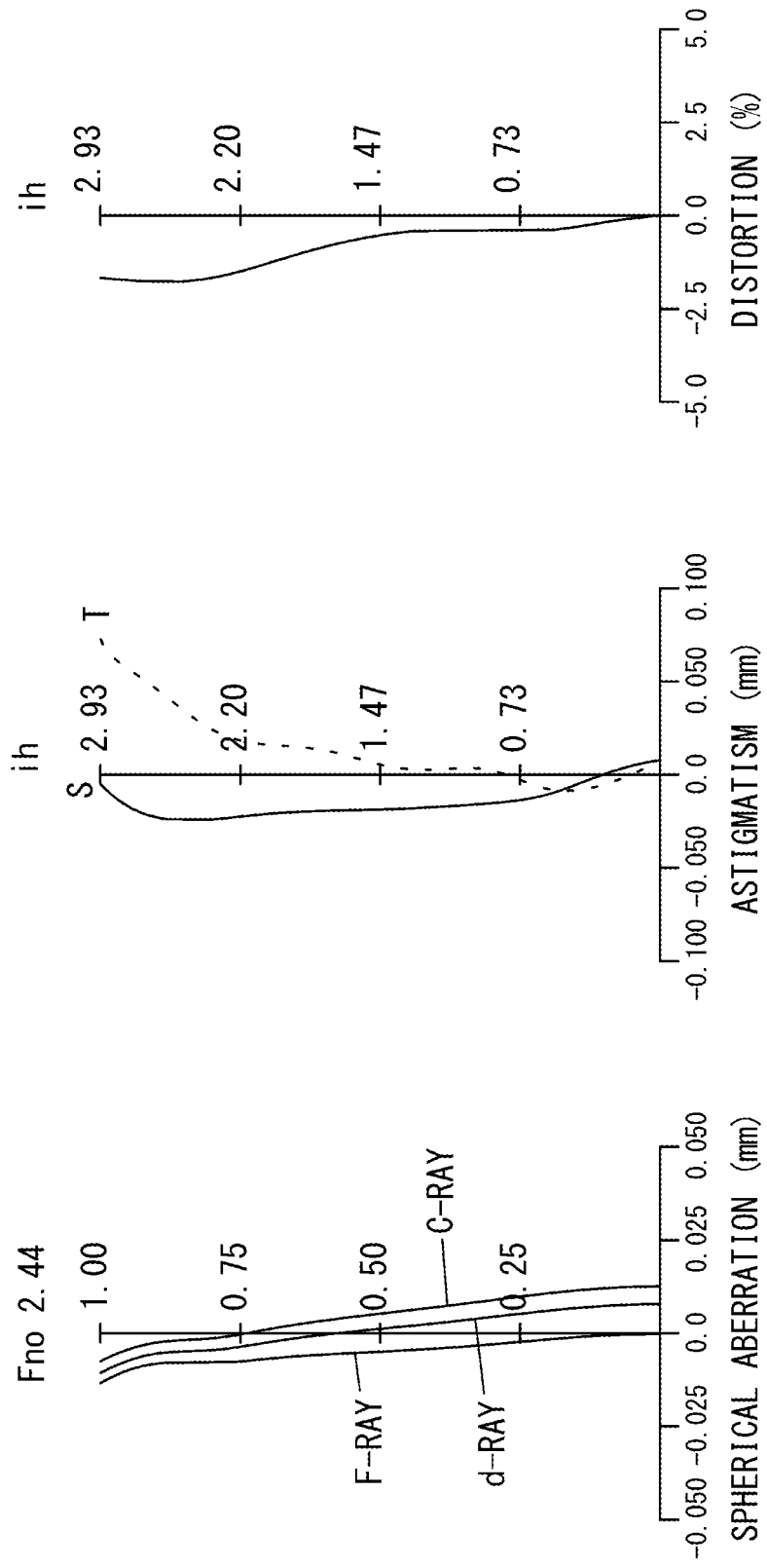
FIG. 2 shows spherical aberration, astigmatism, and distortion of the imaging lens in Example 1 of the present invention.
Figure 3:
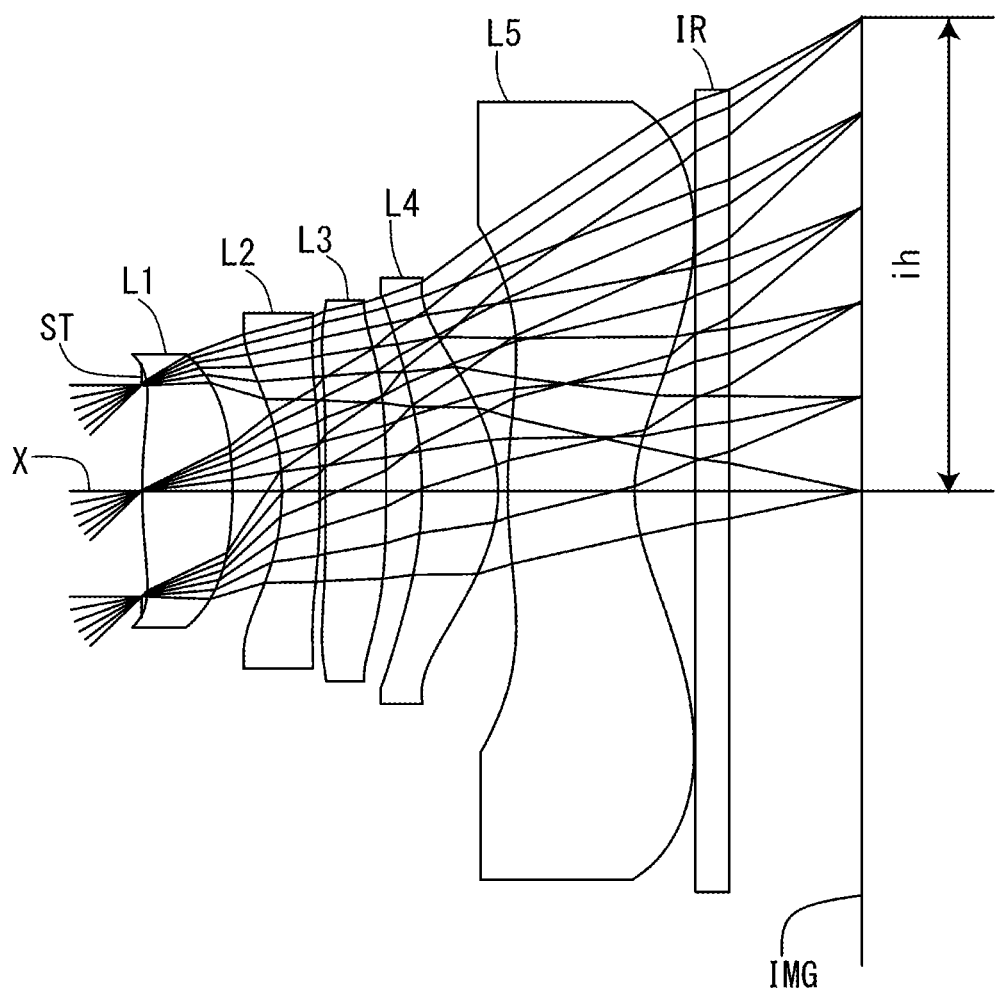
FIG. 3 is a schematic view showing the general configuration of an imaging lens in Example 2 of the present invention.

FIG. 2 shows spherical aberration (mm), astigmatism (mm), and distortion (%) of the imaging lens in Example 1. The spherical aberration diagram shows the amount of aberration at wavelengths of F-ray (486 nm), d-ray (588 nm), and C-ray (656 nm). The astigmatism diagram shows the amount of aberration at d-ray on sagittal image surface S and the amount of aberration at d-ray on tangential image surface T (the same is true for FIGS. 4, 6, 8, and 10). As shown in FIG. 2, each aberration is corrected properly.

In Example 1, total track length TLA is 4.30 mm and the ratio of total track length TLA to maximum image height ih (TLA/2ih) is 0.73, suggesting that the imaging lens is low-profile though it uses five constituent lenses. Furthermore, the imaging lens offers a wide field of view of about 87 degrees and high brightness with an F-value of 2.5 or less.

EXAMPLE 2

The basic lens data of Example 2 is shown in Table 3 below.

TABLE 3

Example 2
in mm
f = 3.17
Fno = 2.42
ω(°) = 44.0
ih = 2.93
TLA = 4.39
bf = 1.34

Surface Data

| Surface No. i | Curvature Radius r | Surface Distance d | Refractive Index Nd | Abbe Number νd |
|---|---|---|---|---|
| (Object Surface) | Infinity | Infinity | | |
| 1 (Stop) | Infinity | 0.005 | | |
| 2* | 3.186 | 0.558 | 1.544 | 55.57 |
| 3* | −2.672 | 0.305 | | |
| 4* | −1.815 | 0.236 | 1.635 | 23.91 |
| 5* | −8.040 | 0.034 | | |
| 6* | 46.476 | 0.376 | 1.544 | 55.57 |
| 7* | −12.893 | 0.222 | | |
| 8* | −2.431 | 0.471 | 1.544 | 55.57 |
| 9* | −0.945 | 0.060 | | |
| 10* | 3.126 | 0.785 | 1.544 | 55.57 |
| 11* | 0.946 | 0.375 | | |
| 12 | Infinity | 0.210 | 1.517 | 64.20 |
| 13 | Infinity | 0.828 | | |
| Image Plane | Infinity | | | |

Constituent Lens Data

| Lens | Start Surface | Focal Length |
|---|---|---|
| 1 | 2 | 2.765 |
| 2 | 4 | −3.747 |
| 3 | 6 | 18.601 |
| 4 | 8 | 2.559 |
| 5 | 10 | −2.856 |

Aspheric Surface Data

| | 2nd Surface | 3rd Surface | 4th Surface | 5th Surface | 6th Surface |
|---|---|---|---|---|---|
| k | 0.000E+00 | 0.000E+00 | 0.000E+00 | 0.000E+00 | 0.000E+00 |
| A4 | −1.185E−01 | −2.388E−01 | −2.389E−01 | −1.323E−01 | −9.541E−02 |
| A6 | −1.399E−01 | −5.418E−02 | 3.436E−01 | 2.253E−01 | −1.506E−02 |
| A8 | 1.238E−03 | 7.200E−02 | 6.994E−02 | 2.379E−02 | 1.734E−01 |
| A10 | −4.352E−01 | −1.459E−01 | −5.471E−02 | −1.775E−01 | −1.173E−01 |
| A12 | 1.251E−01 | 1.575E−01 | −1.462E−01 | 9.742E−02 | 3.288E−02 |
| A14 | 0.000E+00 | −1.991E−01 | 9.210E−02 | −1.809E−02 | −6.025E−03 |
| A16 | 0.000E+00 | 0.000E+00 | 0.000E+00 | 0.000E+00 | 0.000E+00 |

| | 7th Surface | 8th Surface | 9th Surface | 10th Surface | 11th Surface |
|---|---|---|---|---|---|
| k | 0.000E+00 | 0.000E+00 | −8.463E−01 | 0.000E+00 | −4.770E+00 |
| A4 | −1.163E−01 | 2.482E−02 | 1.974E−01 | −1.446E−01 | −6.846E−02 |
| A6 | 3.064E−02 | 8.948E−03 | −1.028E−01 | 3.634E−02 | 2.552E−02 |
| A8 | 8.489E−03 | 7.251E−05 | 8.893E−02 | −1.804E−02 | −8.742E−03 |
| A10 | 2.283E−03 | 1.576E−03 | −3.486E−02 | 8.287E−03 | 2.032E−03 |

TABLE 3-continued

Example 2
in mm
f = 3.17
Fno = 2.42
ω(°) = 44.0
ih = 2.93
TLA = 4.39
bf = 1.34

| A12 | −6.625E−04 | 1.849E−04 | 8.836E−03 | −1.834E−03 | −3.084E−04 |
|---|---|---|---|---|---|
| A14 | 1.841E−03 | −1.533E−03 | 2.233E−03 | 2.625E−04 | 2.826E−05 |
| A16 | 0.000E+00 | 0.000E+00 | −1.588E−03 | −3.693E−05 | −1.288E−06 |

As shown in Table 4 below, the imaging lens in Example 2 satisfies all the conditional expressions (1) to (9).

TABLE 4

| | |
|---|---|
| (1) vd1 − vd2 | 31.66 |
| (2) f1/\|f2\| | 0.74 |
| (3) T12/f | 0.10 |
| (4) f3/f | 5.87 |
| (5) f1/f4 | 1.08 |
| (6) f5/f | −0.90 |
| (7) (r1 + r2)/(r1 − r2) | 0.09 |
| (8) (r3 + r4)/(r3 − r4) | −1.58 |
| (9) (r5 + r6)/(r5 − r6) | 0.57 |

Figure 4:
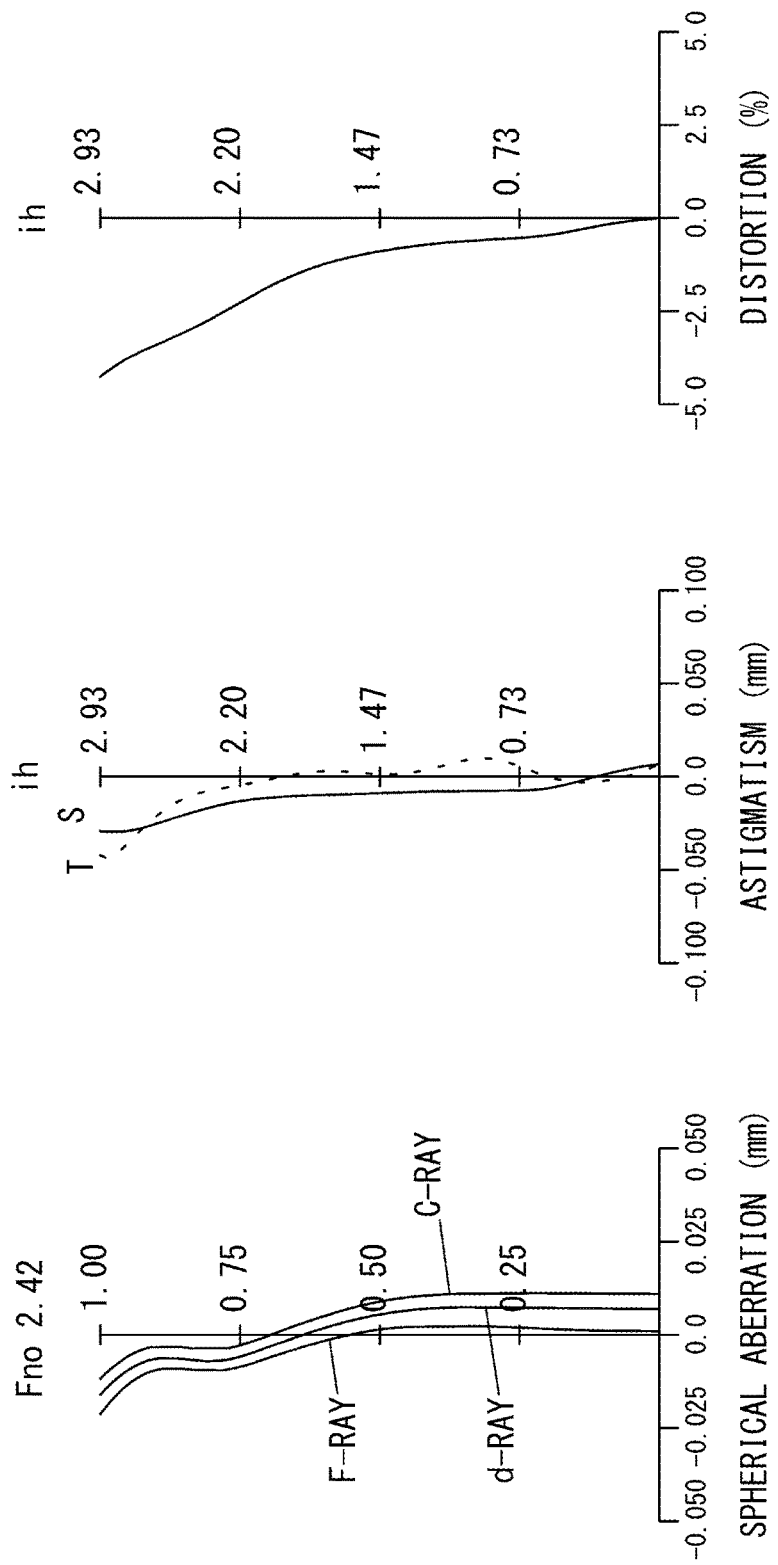
FIG. 4 shows spherical aberration, astigmatism, and distortion of the imaging lens in Example 2 of the present invention.
Figure 5:
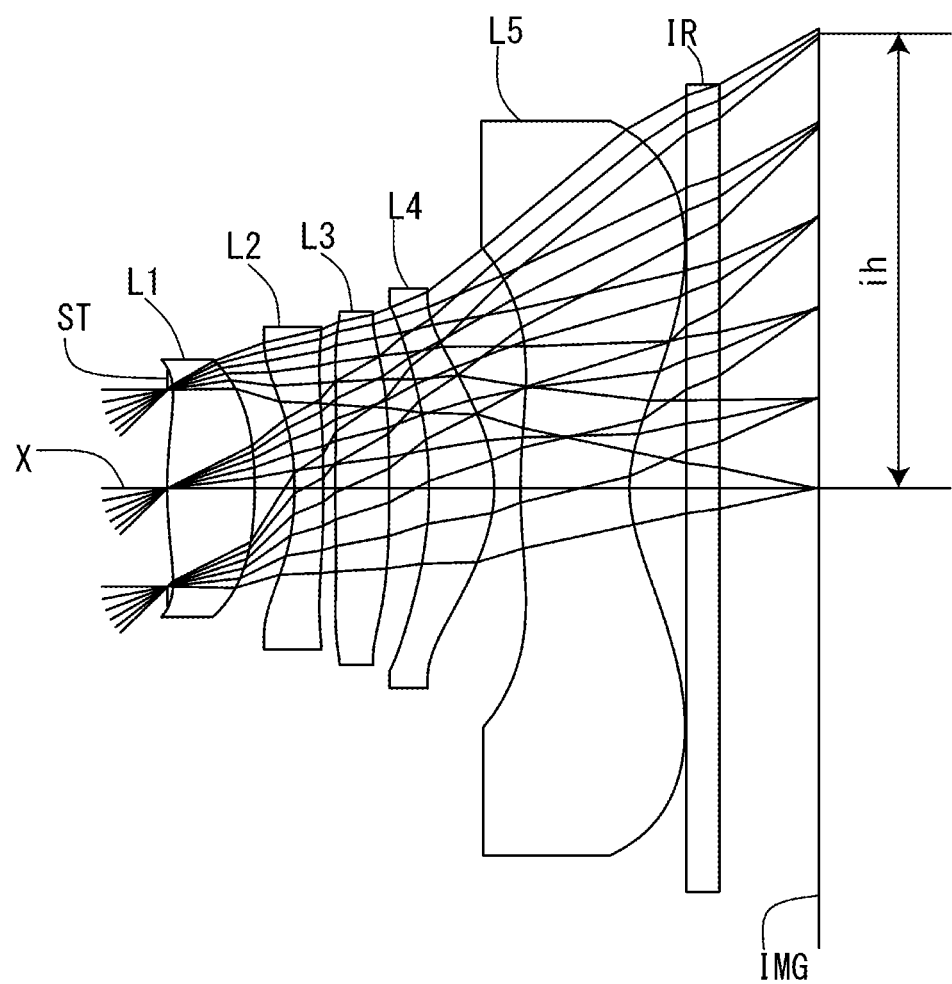
FIG. 5 is a schematic view showing the general configuration of an imaging lens in Example 3 of the present invention.

FIG. 4 shows spherical aberration (mm), astigmatism (mm), and distortion (%) of the imaging lens in Example 2. As shown in FIG. 4, each aberration is corrected properly.

In Example 2, total track length TLA is 4.39 mm and the ratio of total track length TLA to maximum image height ih (TLA/2ih) is 0.75, suggesting that the imaging lens is low-profile though it uses five constituent lenses. Furthermore, the imaging lens offers a wide field of view of about 88 degrees and high brightness with an F-value of 2.5 or less.

EXAMPLE 3

The basic lens data of Example 3 is shown in Table 5 below.

TABLE 5

Example 3
in mm
f = 3.08
Fno = 2.42
ω(°) = 44.3
ih = 2.93
TLA = 4.14
bf = 1.16

Surface Data

| Surface No. i | Curvature Radius r | Surface Distance d | Refractive Index Nd | Abbe Number vd |
|---|---|---|---|---|
| (Object Surface) | Infinity | Infinity | | |
| 1 (Stop) | Infinity | −0.002 | | |
| 2* | 2.940 | 0.564 | 1.544 | 55.57 |
| 3* | −2.645 | 0.257 | | |
| 4* | −1.940 | 0.185 | 1.614 | 25.58 |
| 5* | −13.416 | 0.077 | | |
| 6* | 11.595 | 0.347 | 1.544 | 55.57 |
| 7* | −18.750 | 0.258 | | |
| 8* | −2.508 | 0.420 | 1.544 | 55.57 |
| 9* | −0.962 | 0.170 | | |
| 10* | 3.669 | 0.702 | 1.544 | 55.57 |
| 11* | 0.937 | 0.368 | | |
| 12 | Infinity | 0.210 | 1.517 | 64.20 |
| 13 | Infinity | 0.652 | | |
| Image Plane | Infinity | | | |

Constituent Lens Data

| Lens | Start Surface | Focal Length |
|---|---|---|
| 1 | 2 | 2.655 |
| 2 | 4 | −3.715 |
| 3 | 6 | 13.228 |
| 4 | 8 | 2.618 |
| 5 | 10 | −2.546 |

TABLE 5-continued

Example 3
in mm
f = 3.08
Fno = 2.42
ω(°) = 44.3
ih = 2.93
TLA = 4.14
bf = 1.16

Aspheric Surface Data

|     | 2nd Surface | 3rd Surface | 4th Surface | 5th Surface | 6th Surface |
|-----|-------------|-------------|-------------|-------------|-------------|
| k   | 0.000E+00   | 0.000E+00   | 0.000E+00   | 0.000E+00   | 0.000E+00   |
| A4  | −1.155E−01  | −2.476E−01  | −2.519E−01  | −1.359E−01  | −1.039E−01  |
| A6  | −1.486E−01  | −45.881E−02 | 3.835E−01   | 2.507E−01   | −1.829E−02  |
| A8  | 6.355E−03   | 9.053E−02   | 8.648E−02   | 2.617E−01   | 1.997E−01   |
| A10 | −5.110E−01  | −1.773E−01  | −6.094E−02  | −2.147E−01  | −1.404E−01  |
| A12 | 2.256E−01   | 1.862E−01   | −1.856E−01  | 1.206E−01   | 4.072E−02   |
| A14 | 0.000E+00   | −2.165E−01  | 1.117E−01   | −2.298E−02  | −9.159E−03  |
| A16 | 0.000E+00   | 0.000E+00   | 0.000E+00   | 0.000E+00   | 0.000E+00   |

|     | 7th Surface | 8th Surface | 9th Surface | 10th Surface | 11th Surface |
|-----|-------------|-------------|-------------|--------------|--------------|
| k   | 0.000E+00   | 0.000E+00   | −8.541E−01  | 0.000E+00    | −4.683E+00   |
| A4  | −1.209E−01  | 2.220E−02   | 2.119E−01   | −1.520E−01   | −7.414E−02   |
| A6  | 3.720E−02   | 5.831E−03   | −1.135E−01  | 4.016E−02    | 2.846E−02    |
| A8  | 1.069E−02   | −1.478E−03  | 1.022E−01   | −2.097E−02   | −1.009E−02   |
| A10 | 2.779E−03   | 1.401E−03   | −4.210E−02  | 9.860E−03    | 2.430E−03    |
| A12 | −8.554E−04  | 1.029E−04   | 1.077E−02   | −2.321E−03   | −3.862E−04   |
| A14 | 2.642E−03   | −2.067E−03  | 2.708E−03   | 3.258E−04    | 3.668E−05    |
| A16 | 0.000E+00   | 0.000E+00   | −2.267E−03  | −5.984E−05   | −1.730E−06   |

As shown in Table 6 below, the imaging lens in Example 3 satisfies all the conditional expressions (1) to (9).

TABLE 6

| (1) vd1 − vd2       | 29.99 |
| (2) f1/\|f2\|       | 0.71  |
| (3) T12/f           | 0.08  |
| (4) f3/f            | 4.30  |
| (5) f1/f4           | 1.01  |
| (6) f5/f            | −0.83 |
| (7) (r1 + r2)/(r1 − r2) | 0.05 |
| (8) (r3 + r4)/(r3 − r4) | −1.34 |
| (9) (r5 + r6)/(r5 − r6) | −0.24 |

Figure 6:
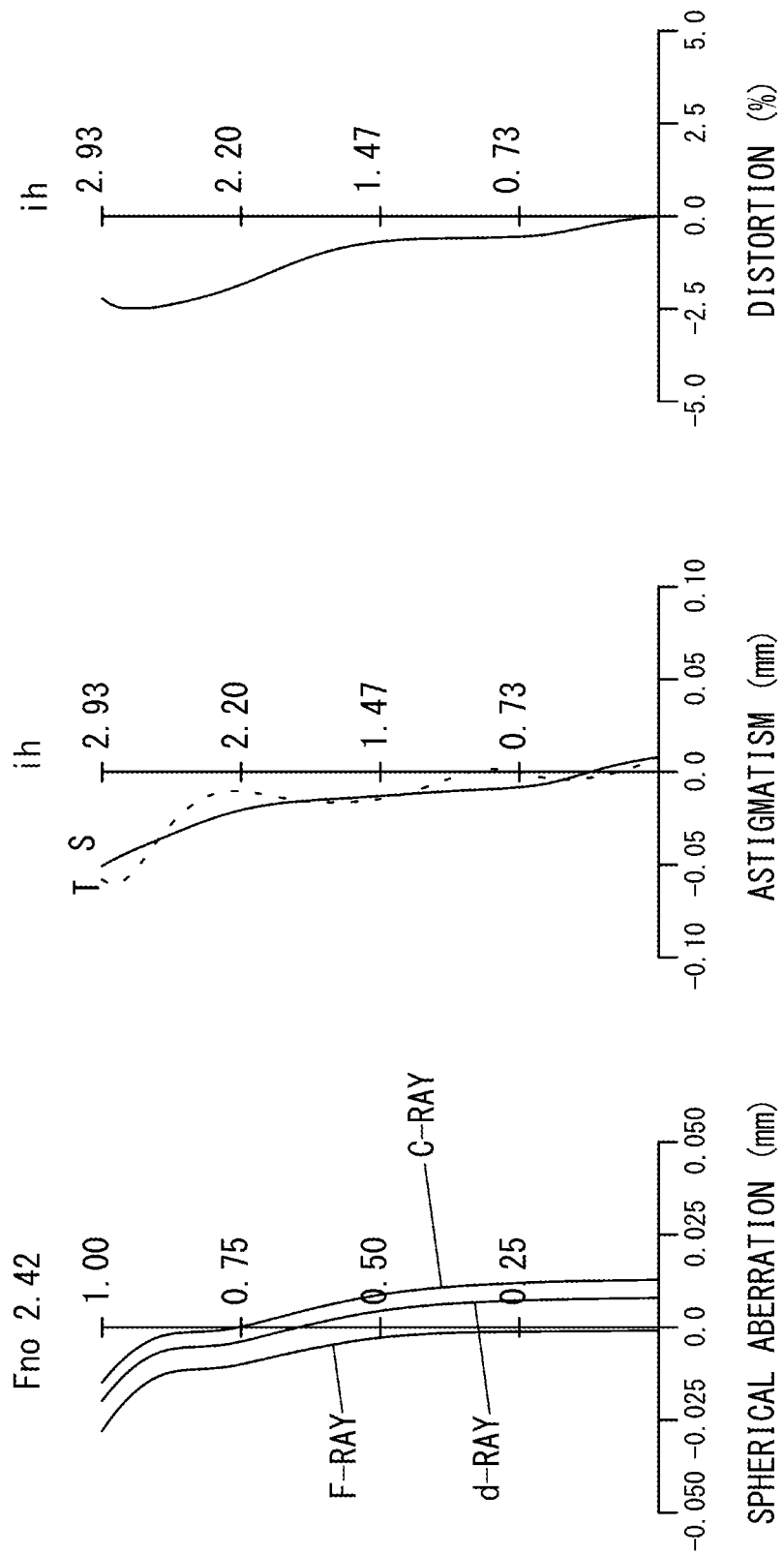
FIG. 6 shows spherical aberration, astigmatism, and distortion of the imaging lens in Example 3 of the present invention.
Figure 7:
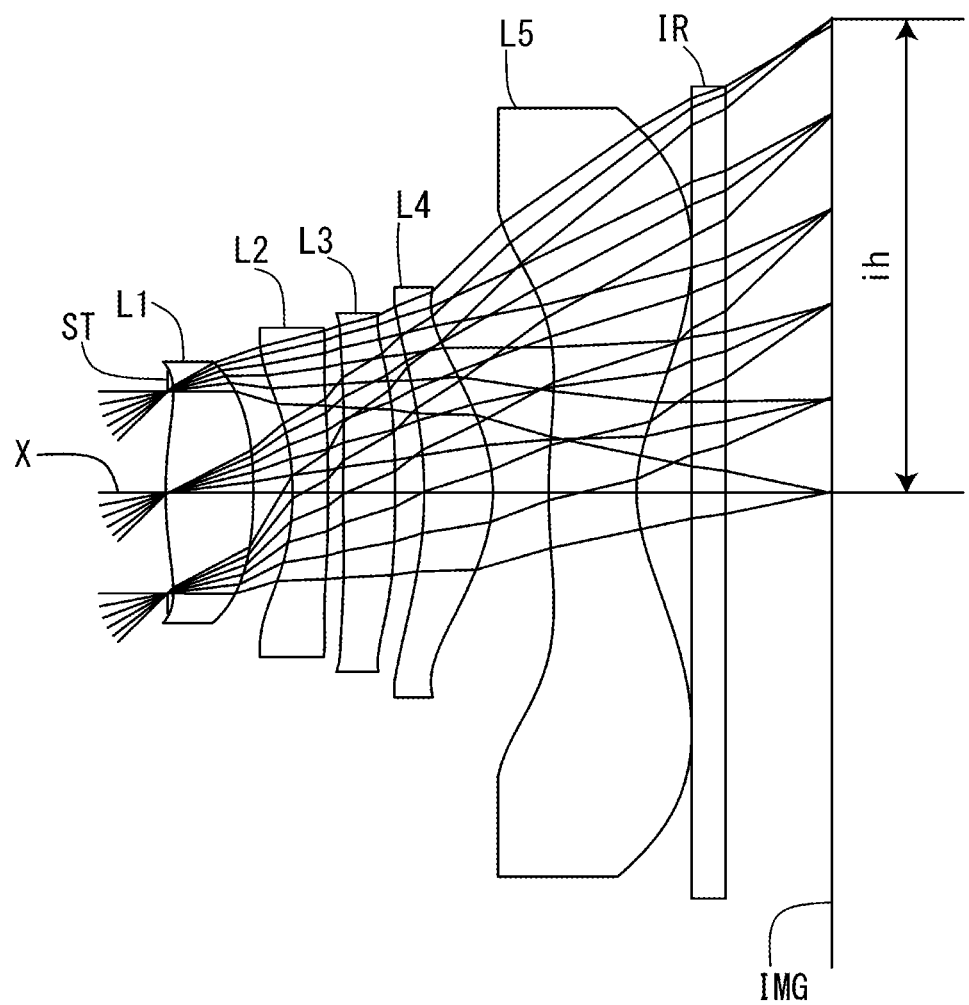
FIG. 7 is a schematic view showing the general configuration of an imaging lens in Example 4 of the present invention.

FIG. 6 shows spherical aberration (mm), astigmatism (mm), and distortion (%) of the imaging lens in Example 3. As shown in FIG. 6, each aberration is corrected properly.

In Example 3, total track length TLA is 4.14 mm and the ratio of total track length TLA to maximum image height ih (TLA/2ih) is 0.71, suggesting that the imaging lens is low-profile though it uses five constituent lenses. Furthermore, the imaging lens offers a wide field of view of about 88 degrees and high brightness with an F-value of 2.5 or less.

EXAMPLE 4

The basic lens data of Example 4 is shown in Table 7 below.

TABLE 7

Example 4
in mm
f = 3.08
Fno = 2.46
ω(°) = 44.6
ih = 2.93
TLA = 4.03
bf = 1.13

Surface Data

| Surface No. i   | Curvature Radius r | Surface Distance d | Refractive Index Nd | Abbe Number vd |
|-----------------|--------------------|--------------------|---------------------|----------------|
| (Object Surface)| Infinity           | Infinity           |                     |                |
| 1 (Stop)        | Infinity           | −0.012             |                     |                |
| 2*              | 2.518              | 0.543              | 1.535               | 56.16          |
| 3*              | −2.928             | 0.242              |                     |                |
| 4*              | −1.868             | 0.220              | 1.614               | 25.58          |
| 5*              | −14.988            | 0.094              |                     |                |

TABLE 7-continued

Example 4
in mm
f = 3.08
Fno = 2.46
ω(°) = 44.6
ih = 2.93
TLA = 4.03
bf = 1.13

| | | | | |
|---|---|---|---|---|
| 6* | 13.008 | 0.321 | 1.544 | 55.57 |
| 7* | −11.467 | 0.181 | | |
| 8* | −2.686 | 0.425 | 1.544 | 55.57 |
| 9* | −0.996 | 0.344 | | |
| 10* | 3.579 | 0.545 | 1.544 | 55.57 |
| 11* | 0.944 | 0.340 | | |
| 12 | Infinity | 0.210 | 1.517 | 64.20 |
| 13 | Infinity | 0.653 | | |
| Image Plane | Infinity | | | |

Constituent Lens Data

| Lens | Start Surface | Focal Length |
|---|---|---|
| 1 | 2 | 2.623 |
| 2 | 4 | −3.496 |
| 3 | 6 | 11.259 |
| 4 | 8 | 2.675 |
| 5 | 10 | −2.544 |

Aspheric Surface Data

| | 2nd Surface | 3rd Surface | 4th Surface | 5th Surface | 6th Surface |
|---|---|---|---|---|---|
| k | 0.000E+00 | 0.000E+00 | 0.000E+00 | 0.000E+00 | 0.000E+00 |
| A4 | −1.174E−01 | −2.682E−01 | −2.764E−01 | −1.430E−01 | −1.208E−01 |
| A6 | −1.451E−01 | −7.935E−02 | 4.359E−01 | 2.807E−01 | −2.874E−02 |
| A8 | 2.008E−02 | 1.120E−01 | 1.014E−01 | 2.606E−02 | 2.327E−01 |
| A10 | −6.690E−01 | −1.873E−01 | −7.993E−02 | −2.738E−01 | −1.798E−01 |
| A12 | 2.332E−01 | 2.624E−01 | −2.473E−01 | 1.553E−01 | 5.165E−02 |
| A14 | 0.000E+00 | −3.913E−01 | 1.552E−01 | −3.702E−02 | −1.377E−02 |
| A16 | 0.000E+00 | 0.000E+00 | 0.000E+00 | 0.000E+00 | 0.000E+00 |

| | 7th Surface | 8th Surface | 9th Surface | 10th Surface | 11th Surface |
|---|---|---|---|---|---|
| k | 0.000E+00 | 0.000E+00 | −8.359E−01 | 0.000E+00 | −4.449E+00 |
| A4 | −1.300E−01 | 2.855E−02 | 2.259E−01 | −1.681E−01 | −8.413E−02 |
| A6 | 4.789E−02 | 1.061E−02 | −1.320E−01 | 4.440E−02 | 3.294E−02 |
| A8 | 1.578E−02 | 3.917E−04 | 1.212E−01 | −2.493E−02 | −1.204E−02 |
| A10 | 4.886E−03 | 3.654E−03 | −5.318E−02 | 1.254E−02 | 3.033E−03 |
| A12 | −1.001E−03 | 1.260E−03 | 1.426E−02 | −3.007E−03 | −5.141E−04 |
| A14 | 3.494E−03 | −2.751E−03 | 4.007E−03 | 4.904E−04 | 5.107E−05 |
| A16 | 0.000E+00 | 0.000E+00 | −3.018E−03 | −5.294E−05 | −2.176E−06 |

As shown in Table 8 below, the imaging lens in Example 4 satisfies all the conditional expressions (1) to (9).

TABLE 8

| | |
|---|---|
| (1) vd1 − vd2 | 30.58 |
| (2) f1/|f2| | 0.75 |
| (3) T12/f | 0.08 |
| (4) f3/f | 3.66 |
| (5) f1/f4 | 0.98 |
| (6) f5/f | −0.83 |
| (7) (r1 + r2)/(r1 − r2) | −0.08 |
| (8) (r3 + r4)/(r3 − r4) | −1.28 |
| (9) (r5 + r6)/(r5 − r6) | 0.06 |

Figure 8:
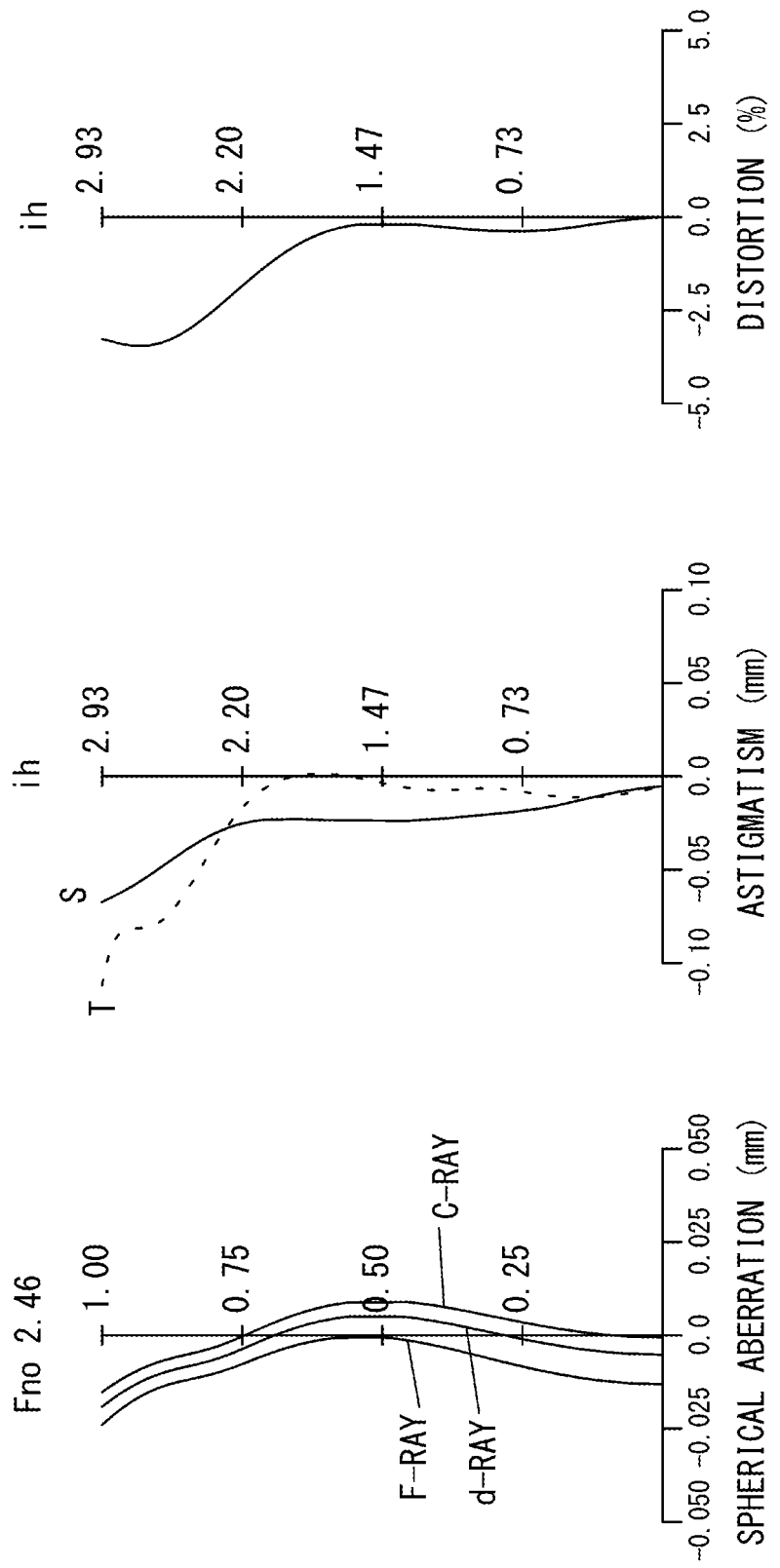
FIG. 8 shows spherical aberration, astigmatism, and distortion of the imaging lens in Example 4 of the present invention.
Figure 9:
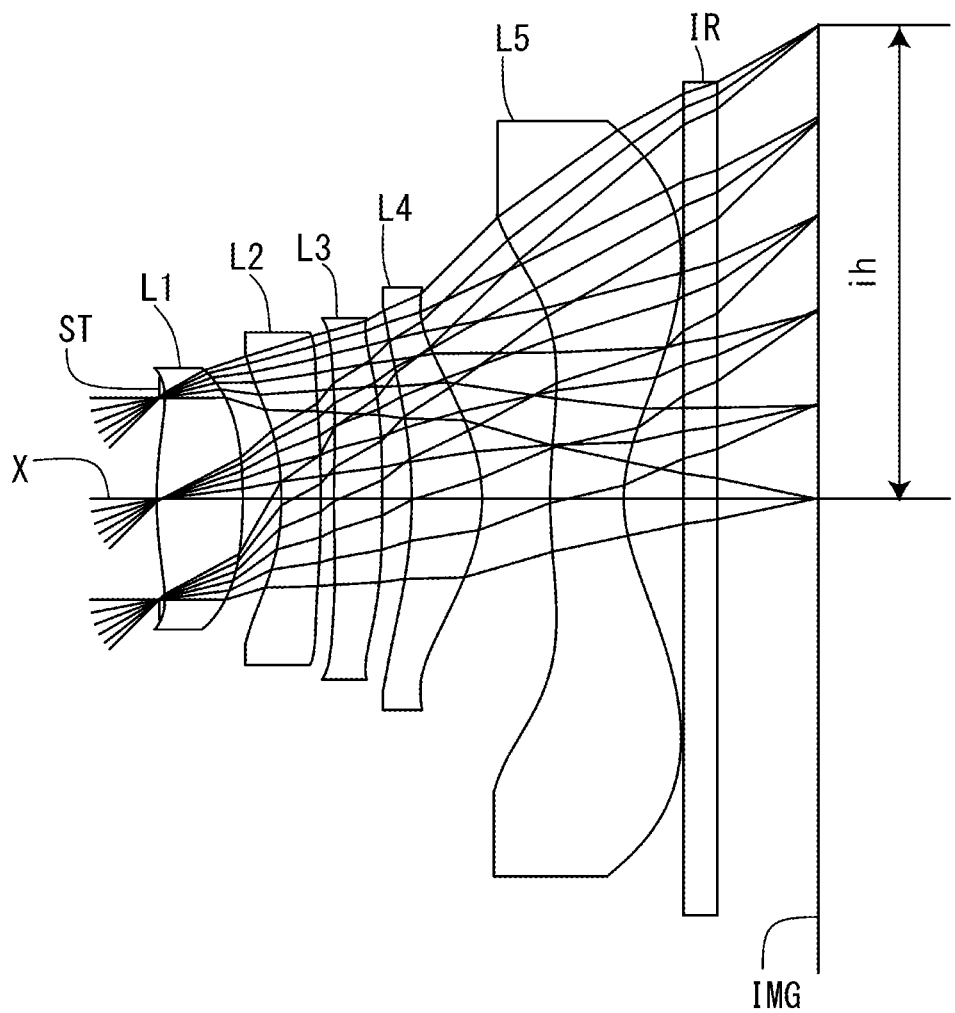
FIG. 9 is a schematic view showing the general configuration of an imaging lens in Example 5 of the present invention.

FIG. 8 shows spherical aberration (mm), astigmatism (mm), and distortion (%) of the imaging lens in Example 4. As shown in FIG. 8, each aberration is corrected properly.

In Example 4, total track length TLA is 4.03 mm and the ratio of total track length TLA to maximum image height ih (TLA/2ih) is 0.69, suggesting that the imaging lens is low-profile though it uses five constituent lenses. Furthermore, the imaging lens offers a wide field of view of about 89 degrees and high brightness with an F-value of 2.5 or less.

EXAMPLE 5

The basic lens data of Example 5 is shown in Table 9 below.

TABLE 9

Example 5
in mm
f = 3.05
Fno = 2.44
ω(°) = 45.0
ih = 2.93
TLA = 4.00
bf = 1.13

Surface Data

| Surface No. i | Curvature Radius r | Surface Distance d | Refractive Index Nd | Abbe Number vd |
|---|---|---|---|---|
| (Object Surface) | Infinity | Infinity | | |
| 1 (Stop) | Infinity | −0.017 | | |
| 2* | 2.474 | 0.533 | 1.535 | 56.16 |
| 3* | −3.138 | 0.238 | | |
| 4* | −1.794 | 0.244 | 1.614 | 25.58 |
| 5* | −11.347 | 0.082 | | |
| 6* | 10.434 | 0.299 | 1.544 | 55.57 |
| 7* | −13.620 | 0.183 | | |
| 8* | −2.773 | 0.435 | 1.544 | 55.57 |
| 9* | −0.995 | 0.421 | | |
| 10* | 3.276 | 0.455 | 1.535 | 56.16 |
| 11* | 0.922 | 0.370 | | |
| 12 | Infinity | 0.210 | 1.517 | 64.20 |
| 13 | Infinity | 0.624 | | |
| Image Plane | Infinity | | | |

Constituent Lens Data

| Lens | Start Surface | Focal Length |
|---|---|---|
| 1 | 2 | 2.676 |
| 2 | 4 | −3.504 |
| 3 | 6 | 10.912 |
| 4 | 8 | 2.627 |
| 5 | 10 | −2.574 |

Aspheric Surface Data

| | 2nd Surface | 3rd Surface | 4th Surface | 5th Surface | 6th Surface |
|---|---|---|---|---|---|
| k | 0.000E+00 | 0.000E+00 | 0.000E+00 | 0.000E+00 | 0.000E+00 |
| A4 | −1.109E−01 | −2.716E−01 | −2.814E−01 | −1.427E−01 | −1.275E−01 |
| A6 | −1.393E−01 | −9.857E−02 | 4.345E−01 | 2.745E−01 | −3.301E−02 |
| A8 | 1.383E−02 | 1.198E−01 | 9.541E−02 | 2.053E−02 | 2.281E−01 |
| A10 | −6.947E−01 | −1.389E−01 | −8.646E−02 | −2.779E−01 | −1.818E−01 |
| A12 | 2.516E−01 | 2.724E−01 | −2.537E−01 | 1.532E−01 | 5.137E−02 |
| A14 | 0.000E+00 | −5.679E−01 | 1.480E−01 | −3.808E−02 | −1.413E−02 |
| A16 | 0.000E+00 | 0.000E+00 | 0.000E+00 | 0.000E+00 | 0.000E+00 |

| | 7th Surface | 8th Surface | 9th Surface | 10th Surface | 11th Surface |
|---|---|---|---|---|---|
| k | 0.000E+00 | 0.000E+00 | −8.525E−01 | 0.000E+00 | −4.018E+00 |
| A4 | −1.297E−01 | 2.882E−02 | 2.302E−01 | −1.680E−01 | −9.001E−02 |
| A6 | 4.059E−02 | 1.436E−02 | −1.341E−01 | 4.289E−02 | 3.440E−02 |
| A8 | 1.561E−02 | 5.927E−04 | 1.206E−01 | −2.504E−02 | −1.217E−02 |
| A10 | 5.678E−03 | 2.628E−03 | −5.324E−02 | 1.249E−02 | 3.018E−03 |
| A12 | −7.109E−04 | 5.265E−04 | 1.427E−02 | −3.042E−03 | −5.148E−04 |

TABLE 9-continued

Example 5
in mm
f = 3.05
Fno = 2.44
ω(°) = 45.0
ih = 2.93
TLA = 4.00
bf = 1.13

| | | | | | |
|---|---|---|---|---|---|
| A14 | 3.141E−03 | −2.717E−03 | 3.938E−03 | 4.838E−04 | 5.112E−05 |
| A16 | 0.000E+00 | 0.000E+00 | −3.148E−03 | −4.713E−05 | −2.124E−06 |

As shown in Table 10 below, the imaging lens in Example 5 satisfies all the conditional expressions (1) to (9).

TABLE 10

| | |
|---|---|
| (1)vd1 − vd2 | 30.58 |
| (2)f1/\|f2\| | 0.76 |
| (3)T12/f | 0.08 |
| (4)f3/f | 3.57 |
| (5)f1/f4 | 1.02 |
| (6)f5/f | −0.84 |
| (7)(r1 + r2)/(r1 − r2) | −0.12 |
| (8)(r3 + r4)/(r3 − r4) | −1.38 |
| (9)(r5 + r6)/(r5 − r6) | −0.13 |

FIG. 10 shows spherical aberration (mm), astigmatism (mm), and distortion (%) of the imaging lens in Example 5. As shown in FIG. 10, each aberration is corrected properly.

In Example 5, total track length TLA is 4.00 mm and the ratio of total track length TLA to maximum image height ih (TLA/2ih) is 0.68, suggesting that the imaging lens is low-profile though it uses five constituent lenses. Furthermore, the imaging lens offers a wide field of view of about 90 degrees and high brightness with an F-value of 2.5 or less.

As explained above, the imaging lenses in the examples according to the preferred embodiment of the present invention are low-profile enough to meet the growing demand for low-profileness, in which total track length TLA is 4.4 mm or less and the ratio of total track length TLA to maximum image height ih (TLA/2ih) is 0.8 or less, though they use five constituent lenses. In addition, these imaging lenses offer a wide field of view of about 87 to about 90 degrees and high brightness with an F-value of 2.5 or less and correct various aberrations properly and can be supplied at low cost.

When any one of the imaging lenses composed of five constituent lenses in the examples according to the preferred embodiment of the present invention is used for an optical system built in an image pickup device mounted in an increasingly compact and low-profile smartphone, mobile phone, tablet PC, PDA (Personal Digital Assistant), game console, information terminal such as a PC, or home appliance with a camera function, it delivers high camera performance and realizes a low-profile camera with a wide field of view.

The effects of the present invention are as follows.

According to the present invention, it is possible to provide a compact low-cost low-profile imaging lens which offers a wide field of view and brightness with an F-value of 2.5 or less and corrects various aberrations properly.

What is claimed is:

1. An imaging lens which forms an image of an object on a solid-state image sensor, comprising, in order from an object side to an image side of the imaging lens:

a first lens with positive refractive power having a convex object-side surface;

a second lens with negative refractive power having a concave object-side surface;

a third lens with positive refractive power having a convex object-side surface and a convex image-side surface, at least one of which is aspheric;

a fourth lens with positive refractive power that is a double-sided aspheric lens having a convex image-side surface; and a fifth lens with negative refractive power that is a double-sided aspheric lens having a concave image-side surface, wherein a conditional expression (1), (5), and (6') below are satisfied:

$$20 < vd1 - vd2 < 50 \quad (1)$$

$$0.8 < f1/f4 < 1.4 \quad (5)$$

$$-1.2 < f5/f \leq -0.83 \quad (6')$$

where
vd1: Abbe number of the first lens at d-ray,
vd2: Abbe number of the second lens at d-ray,
f: overall focal length of the imaging lens,
f1: focal length of the first lens,
f4: focal length of the fourth lens, and
f5: focal length of the fifth lens.

2. The imaging lens according to claim 1, wherein conditional expressions (2) and (3) below are satisfied:

$$0.5 < f1/|f2| < 1.2 \quad (2)$$

$$0.04 < T12/f < 0.14 \quad (3)$$

where
f2: focal length of the second lens, and
T12: air gap between the first lens and the second lens on an optical axis of the imaging lens.

3. The imaging lens according to claim 2, wherein a conditional expression (4) below is satisfied:

$$2.0 < f3/f < 8.0 \quad (4)$$

where
f3: focal length of the third lens.

4. The imaging lens according to claim 2, wherein a conditional expression (7) below is satisfied:

$$-0.4 < (r1+r2)/(r1-r2) < 0.15 \quad (7)$$

where
r1: curvature radius of the object-side surface of the first lens, and
r2: curvature radius of an image-side surface of the first lens.

5. The imaging lens according to claim 4, wherein a conditional expression (8) below is satisfied:

$$-1.9 < (r3+r4)/(r3-r4) < -0.9 \quad (8)$$

where
r3: curvature radius of the object-side surface of the second lens, and
r4: curvature radius of an image-side surface of the second lens.

6. The imaging lens according to claim 5, wherein a conditional expression (9) below is satisfied:

$$-1.0 < (r5+r6)/(r5-r6) < 1.0 \quad (9)$$

where
r5: curvature radius of the object-side surface of the third lens, and
r6: curvature radius of the image-side surface of the third lens.

7. The imaging lens according to claim 1, wherein a conditional expression (4) below is satisfied:

$$2.0 < f3/f < 8.0 \quad (4)$$

where
f3: focal length of the third lens.

8. The imaging lens according to claim 1, wherein a conditional expression (7) below is satisfied:

$$-0.4 < (r1+r2)/(r1-r2) < 0.15 \quad (7)$$

where
r1: curvature radius of the object-side surface of the first lens, and
r2: curvature radius of an image-side surface of the first lens.

9. The imaging lens according to claim 8, wherein a conditional expression (8) below is satisfied:

$$-1.9 < (r3+r4)/(r3-r4) < -0.9 \quad (8)$$

where
r3: curvature radius of the object-side surface of the second lens, and
r4: curvature radius of an image-side surface of the second lens.

10. The imaging lens according to claim 9, wherein a conditional expression (9) below is satisfied:

$$-1.0 < (r5+r6)/(r5-r6) < 1.0 \quad (9)$$

where
r5: curvature radius of the object-side surface of the third lens, and
r6: curvature radius of the image-side surface of the third lens.

11. The imaging lens according to claim 1, wherein a conditional expression (8) below is satisfied:

$$-1.9 < (r3+r4)/(r3-r4) < -0.9 \quad (8)$$

where
r3: curvature radius of the object-side surface of the second lens, and
r4: curvature radius of an image-side surface of the second lens.

12. The imaging lens according to claim 11, wherein a conditional expression (9) below is satisfied:

$$-1.0 < (r5+r6)/(r5-r6) < 1.0 \quad (9)$$

where
r5: curvature radius of the object-side surface of the third lens, and
r6: curvature radius of the image-side surface of the third lens.

13. The imaging lens according to claim 1, wherein a conditional expression (9) below is satisfied:

$$-1.0 < (r5+r6)/(r5-r6) < 1.0 \quad (9)$$

where
r5: curvature radius of the object-side surface of the third lens, and
r6: curvature radius of the image-side surface of the third lens.

14. An imaging lens which forms an image of an object on a solid-state image sensor, comprising, in order from an object side to an image side of the imaging lens:
a first lens with positive refractive power having a convex object-side surface;
a second lens with negative refractive power having a concave object-side surface;
a third lens with positive refractive power having a convex object-side surface and a convex image-side surface, at least one of which is aspheric;
a fourth lens with positive refractive power that is a double-sided aspheric lens having a convex image-side surface; and
a fifth lens with negative refractive power that is a double-sided aspheric lens having a concave image-side surface,
wherein conditional expressions (1), (2'), (3'), and (4') below are satisfied:

$$20 < vd1 - vd2 < 50 \quad (1)$$

$$0.5 < f1/|f2| \leq 0.76 \quad (2')$$

$$0.08 \leq T12/f < 0.14 \quad (3')$$

$$3.57 \leq f3/f < 8.0 \quad (4')$$

where
vd1: Abbe number of the first lens at d-ray,
vd2: Abbe number of the second lens at d-ray,
f: overall focal length of the imaging lens,
f1: focal length of the first lens,
f2: focal length of the second lens,
f3: focal length of the third lens, and
T12: air gap between the first lens and the second lens on an optical axis of the imaging lens.

* * * * *